Dec. 7, 1926.
W. T. CHAPMAN
1,610,038
DEMAND INDICATOR AND CONTROLLER
Filed Dec. 18, 1924
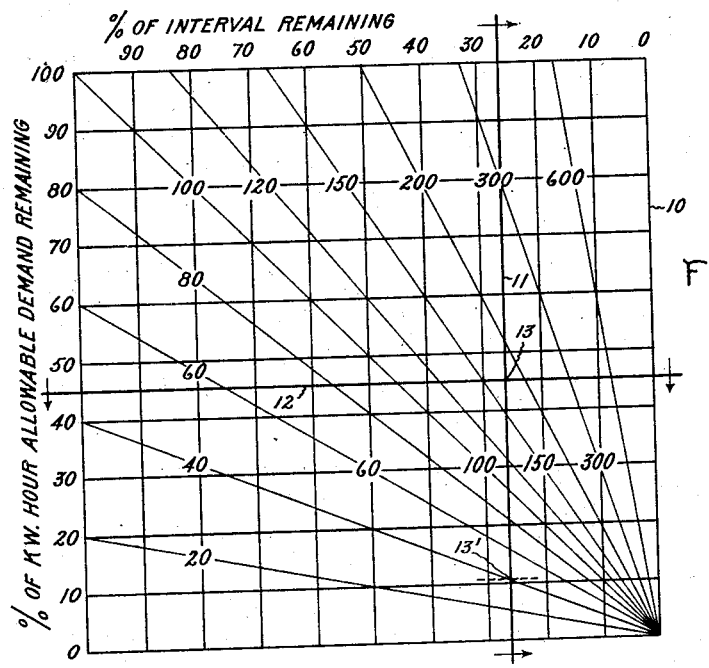
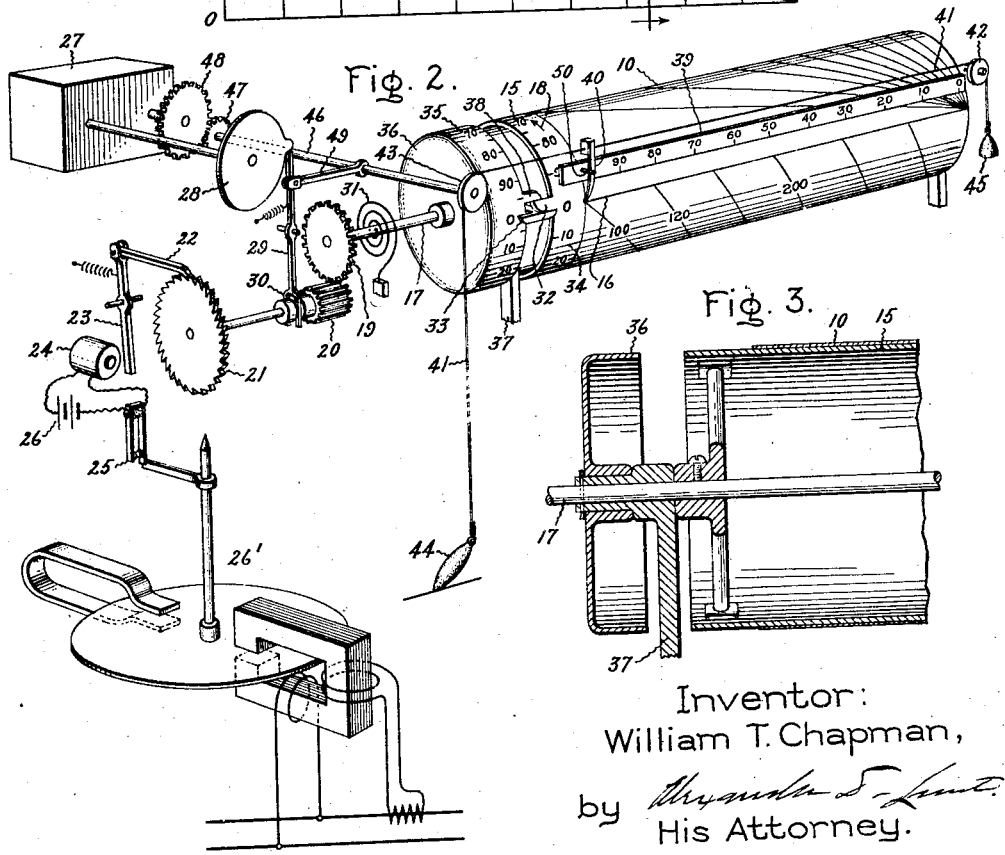
Inventor:
William T. Chapman,
by *[signature]*
His Attorney.

Patented Dec. 7, 1926.

1,610,038

UNITED STATES PATENT OFFICE.

WILLIAM T. CHAPMAN, OF NISKAYUNA, NEW YORK, ASSIGNOR TO GENERAL ELECTRIC COMPANY, A CORPORATION OF NEW YORK.

DEMAND INDICATOR AND CONTROLLER.

Application filed December 18, 1924. Serial No. 756,811.

My invention relates to a demand indicator, particularly adapted for use in connection with electric power installations where an extra charge is made if the energy is taken at an average rate in excess of an agreed maximum demand over a predetermined interval.

In such installations it is desirable that the consumer shall not exceed some previously established maximum demand. On the other hand, it is usually more economical for the consumer when he uses power up to the maximum demand limit. It is therefore desirable that a device be provided which will indicate at all times during any demand interval, the maximum load which may be carried during the remainder of the demand interval to reach but not exceed the established maximum demand.

My invention relates to such a device. The device is also preferably arranged to indicate the maximum demand reached during a month or other desirable period, the integrated consumption during any part of a demand interval, and the time over which such consumption is integrated.

The features of my invention which are believed to be novel and patentable will be pointed out in the claims appended hereto. For a better understanding of my invention, reference is made in the following description to the accompanying drawing in which Fig. 1 represents a chart to be referred to in explaining the principle of my invention; Fig. 2 represents a perspective view of apparatus for carrying out my invention; and Fig. 3 is a detail of construction of the apparatus represented in Fig. 2.

Referring now to Fig. 1, 10 represents a chart graduated in rectangular coordinates. The chart is provided with vertical lines representing time graduations. In the present case these graduations are marked per cent of interval remaining. Thus, if an indicator 11 be moved from the left side of the chart toward the right at a uniform rate such that it would travel over the chart in a demand interval, the indications along the top of the chart will show at any instant the per cent of the time interval remaining. The horizontal lines of the chart are representative of the per cent of allowable maximum demand remaining and are so graduated. For example, if the maximum demand allowable during a particular time interval is 1000 kilowatt hours and 800 kilowatt hours are consumed in the first half of the demand interval, only 200 kilowatt hours, or 20% of the allowable demand, remains. If an indicator 12 is moved relative to the chart, starting at the upper side at the beginning of a demand interval and moved downward at a rate proportional to the consumption of electric energy, such that when the consumption over the demand interval is equal to the allowable demand, the indicator reaches the bottom of the chart at exactly the end of the time interval, the indicator will correctly indicate the per cent of allowable demand remaining at any instant during the demand interval. The chart is also provided with a series of lines radiating from the lower right hand corner which are representative of the per cent of rated load which may be carried during the remainder of a time interval, which value is indicated by the crossing point 13 of the two indicator arms 11 and 12. By rated load I mean the average load which may be carried to reach, but not exceed, the maximum allowable demand. Thus, if the indicators 11 and 12 start together at the beginning of a demand interval at the upper left hand corner and the load is just equal to the rated load, the intersection of the two indicating rods will follow the true diagonal line of the chart representative of 100% rated load to the lower right hand corner. If the load is less than rated load, indicator 12 will not move so fast and the intersection will fall above the 100% rated load line for example, as illustrated in Fig. 1, where the intersection lies between the 150% and 200% rated load lines indicating that for the remainder of the interval approximately 170% rated load should be held to bring the demand over the interval up to the maximum allowable demand. If the load during the early part of the demand interval had exceeded the rated load, indicator 12 would have moved faster so as to bring the intersection of the two indicating rods below the 100% line, for example at point 13', indicating that for the remainder of the interval only 40% of the rated load should be carried if the allowable maximum demand for the interval is not to be exceeded. While the various graduations are represented in per cent, they may be given in the units actually used, for example, minutes, kilowatt hours and kilowatts.

In Fig. 2, I have represented apparatus for carrying out the indicating principle just explained. In this figure a chart 10, graduated similar to that represented in Fig. 1, is placed upon the surface of a drum 15 in the form of a cylinder with the top and bottom of the chart coming together on a horizontal line of the cylinder represented at 16. The cylinder, and with it the chart, is rotatable with a shaft 17 at a rate proportional to the consumption of electric energy in the direction of the arrow 18. The means of moving the chart consists in this instance of gears 19 and 20, ratchet wheel 21, ratchet pawl 22, armature lever 23 and relay 24. Relay 24 is in the circuit of contacts 25 and a source of supply 26 and the contacts are closed by the watthour meter 26' at a rate proportional to the consumption of energy measured by the meter. A timing device 27 operates a cam wheel 28 which cooperates with a lever 29 having a forked end 30 engaging the slidable pinion gear 20. At the end of a demand interval as determined by the timing device, pinion 20 is thus disengaged from gear 19 and a spring 31, which is wound up when the chart 10 is advanced, returns the chart and drum to a zero position such as is indicated in the drawing, with a projection 32 on the drum against a stationary stop 33. Extending from the right of stop 33 is an indicator which cooperates with a scale 34 on the end of drum 15, whereby the demand over any part of an interval is indicated. Extending from the left of stop 33 is an indicator which cooperates with a scale 35 on the surface of a separate drum 36. The drum 36 is independently pivoted on the support 37 and is rotated by means of the projection 32 on drum 15 and a finger 38 on drum 36 when the drum 15 is rotated in the direction of the arrow 18. When drum 15 is reset to a zero position, drum 36 remains in the position of maximum rotation and thus indicates the maximum demand over a number of successive intervals, for example over a period of a month, or over such other time as is desired after which the drum 36 is reset against projection 32 by hand.

Adjacent the chart 10 is a stationary time scale 39 and cooperating with this scale and with chart 10 is a time controlled indicator 40. This indicator 40 is secured to a flexible cord 41 which passes over pulleys 42 and 43 at opposite ends of the drum. The ends of the cord are provided with weights 44 and 45, weight 44 being somewhat heavier than weight 45. Pulley 43 is normally driven in a direction to move cord 41, and with it indicator 40, to the right, by the timing device 27 to which pulley 43 is mechanically connected through shaft 46 and gears 47—48.

At the end of a demand interval as determined by the cam wheel 28, gear 47 is moved away from gear 48 by reason of the connection 49 between shaft 46 and cam lever 29, so that when thus disengaged, weight 44 falls and moves the indicator 40 against a stop 50 and positions indicator 40 at the left hand end of the time scale 39 and the chart 10.

The position of the parts represented in Fig. 2 indicates the beginning of a time interval. The rotation of the meter 26' causes the actuation of relay 24 and the rotation of drum 15. The driving connection between the meter 26' and drum 15 will be such that for rated load, the drum will make one revolution per demand interval. It is not essential however that the chart occupy the complete circumference of the drum and in case the chart occupies for example three-quarters of the circumference of the drum, the gear ratio should be such as to cause the drum to make three-quarters of a revolution per demand interval with rated load. The clock causes the indicator 40 to be moved to the right at a rate such that it will reach the right hand end of the chart at the end of a demand interval. The indicator is thus caused to cooperate with the chart and indicate thereon the load which should be held during the remainder of any portion of a demand interval in order to reach but not exceed the maximum allowable demand during that interval and the scale 39 to the right of the indicator 40 indicates the length of time remaining in the interval so that at any time during a demand interval the operator can tell just how long he is to hold a given load in order to obtain the maximum operating economy. For example, let us suppose that during the first half of a demand interval, no consumption of electric energy and no rotation of the drum takes place. This will bring indicator 40 opposite the line marked 200 on the chart indicating that 200% rated load, or 200 kilowatts as the case may be, should be carried over the last half of the time interval in order to utilize the maximum amount of power without exceeding the maximum demand rate.

Fig. 3 represents a cross-section through the left hand end of the drum to show one manner of rotatably supporting the parts.

In accordance with the provisions of the patent statutes, I have described the principle of operation of my invention, together with the apparatus which I now consider to represent the best embodiment thereof; but I desire to have it understood that the apparatus shown and described is only illustrative and that the invention can be carried out by other means.

What I claim as new and desire to secure by Letters Patent of the United States, is—

1. A rate indicator comprising in combination a device operating at a constant rate, a device operable at a variable rate, and time controlled means for establishing predetermined time periods and for establishing initial indicating positions of said two devices at the beginning of each such period, said two devices cooperating together over a given period of time to indicate the rate at which the variable rate device must be operated during a remaining portion of such period of time to maintain a predetermined average rate over said given period of time.

2. A rate indicator for power installations comprising in combination a timing device, a meter, and two indicating devices, one operated at a rate proportional to the timing device and the other operated at a rate proportional to that of the meter, and means for establishing initial indicating positions of said two indicating devices at predetermined time intervals whereby the rates of said two indicating devices may be compared over a given interval of time to obtain an indication of the rate at which the meter should be operated during any remaining portion of said given interval of time to maintain a predetermined average rate over the whole interval.

3. A demand meter for power installations comprising an energy meter, a graduated member operated at a rate proportional to the rate of the meter, a timing device, means operated by said timing device for periodically resetting said member to an initial position, an indicator operated by said timing device, said indicator cooperating with said graduated member to indicate at all times during a demand interval the rate at which the energy meter should be operated during the then remaining portion of the demand interval to maintain a predetermined average rate over the whole interval.

4. A rate indicator comprising in combination a time controlled indicator and an indicator operable at a variable rate, said two indicators cooperating together to indicate the rate at which the last mentioned indicator should be operated during any remaining part of a given period of time to maintain a predetermined average rate over said given period of time, and means for indicating such remaining portion of the given period of time.

5. A demand indicator comprising a meter, a graduated member operated at a rate proportional to said meter, a timing device, an indicator operated thereby, means controlled by said timing device for resetting said graduated member and indicator to zero positions at the end of each demand interval, said member and indicator cooperating together to indicate the rate at which the meter should be operated during any remaining portion of a demand interval to maintain a predetermined average rate over the whole interval, and means operated by said timing device for indicating such remaining time.

6. In combination, an integrating type meter, a timing device, a time indicator, a rate chart having rectangular dimensions respectively representative of time and rate units, means for moving said chart relative to a zero reference line in the direction of the rate unit dimension at a rate proportional to that of the integrating meter, means for moving the time indicator along said reference line in a direction of the time unit dimension at the rate of the timing device, and means for resetting said movable devices to a zero position with said time indicator on said reference line at one corner of the chart when said time indicator has traversed the chart.

7. In combination, an integrating meter, a timing device, a rate chart, an indicator cooperating with said chart, means responsive to the integrating meter for producing relative movement of said chart and indicator in one direction during a demand interval, and means responsive to the timing device for producing relative movement of said chart and indicator in another direction during the same demand interval and producing by their combined movements an indication at all times representative of the rate at which the meter should operate during the remainder of the demand interval to maintain a predetermined rate over the total demand interval.

8. In combination, a cylindrical rate chart, an integrating meter, means for rotating said chart on its axis at a rate proportional to that of the meter, a timing device, an indicator cooperating with said chart, means responsive to said timing device for moving said indicator axially with respect to the chart, means for setting said chart and indicator to zero positions at predetermined intervals of time, and graduations on said chart with which said indicator cooperates to indicate at all times between the reset periods the rate at which the meter should be operated during the then remaining part of such interval to maintain a predetermined average rate over such predetermined interval.

9. In combination, an electric power circuit subject to a variable rate of energy flow, an electric meter for measuring the energy of said circuit, a maximum demand meter associated with said energy meter for measuring the maximum demand of said circuit over predetermined demand intervals, and means associated with said demand meter for indicating the allowable rate of energy flow in said circuit at all times during such demand intervals to reach but not exceed a predetermined demand.

In witness whereof, I have hereunto set my hand this 17th day of December, 1924.

WILLIAM T. CHAPMAN.